United States Patent
Miyamoto

(10) Patent No.: US 7,748,885 B2
(45) Date of Patent: Jul. 6, 2010

(54) LIQUID CRYSTAL DISPLAY APPARATUS AND LIGHTING UNIT

(75) Inventor: Hitoshi Miyamoto, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 230 days.

(21) Appl. No.: 12/006,914

(22) Filed: Jan. 7, 2008

(65) Prior Publication Data
US 2008/0165305 A1    Jul. 10, 2008

(30) Foreign Application Priority Data
Jan. 9, 2007    (JP)    ............... 2007-001611

(51) Int. Cl.
*F21V 7/04*    (2006.01)
(52) U.S. Cl. ............ 362/634; 362/600; 362/611; 362/613; 362/614; 362/630; 362/631; 362/632; 362/633; 362/97.1; 362/97.2
(58) Field of Classification Search ........ 362/600, 362/611, 613, 614, 630–634, 97.1–97.2
See application file for complete search history.

(56) References Cited

U.S. PATENT DOCUMENTS

| | | | | |
|---|---|---|---|---|
| 6,843,584 | B2 * | 1/2005 | Bang et al. ............ | 362/97.1 |
| 7,455,421 | B2 * | 11/2008 | Suzuki .............. | 362/221 |
| 2004/0027049 | A1 * | 2/2004 | Lee et al. ............ | 313/486 |
| 2006/0092633 | A1 | 5/2006 | Kim et al. | |
| 2006/0221607 | A1 | 10/2006 | Chang et al. | |
| 2008/0101074 | A1 * | 5/2008 | Ogura et al. ............ | 362/382 |

FOREIGN PATENT DOCUMENTS

| | | |
|---|---|---|
| JP | H05-004662 U | 1/1993 |
| JP | 2001-076529 A | 3/2001 |
| JP | 2002-324592 | 11/2002 |
| JP | 2002-324592 A | 11/2002 |
| WO | 2006/070645 A | 7/2006 |

OTHER PUBLICATIONS

Japanese Notice of the reason for refusal, dated Dec. 10, 2008.
The extended European search report, pursuant to Rule 62 EPC dated Apr. 17, 2008, searched on Apr. 1, 2008.

* cited by examiner

*Primary Examiner*—Sandra L O'Shea
*Assistant Examiner*—William J Carter
(74) *Attorney, Agent, or Firm*—Yokoi & Co., U.S.A., Inc.; Toshiyuki Yokoi

(57) ABSTRACT

The present invention discloses a lighting unit comprising: a reflector panel; a plurality of substantially U-shaped cold cathode tubes held parallel relative to the reflector panel; an inverter substrate; cold cathode tube holders for holding the cold cathode tubes parallel relative to the reflector panel in such a manner that terminals of the cold cathode tubes are arranged in a row along one side of the reflector panel; a substrate holder for holding the inverter substrate to be vertically relative to the reflector panel in such a manner that a lower side of the inverter substrate reaches a positions where the terminals are arranged in a row; a plurality of notches upwardly cut deep from the lower side of the inverter substrate so as to receive the terminals; and solders provided for making electrical connections between the terminals and electrical supply patterns formed in the notches.

5 Claims, 6 Drawing Sheets

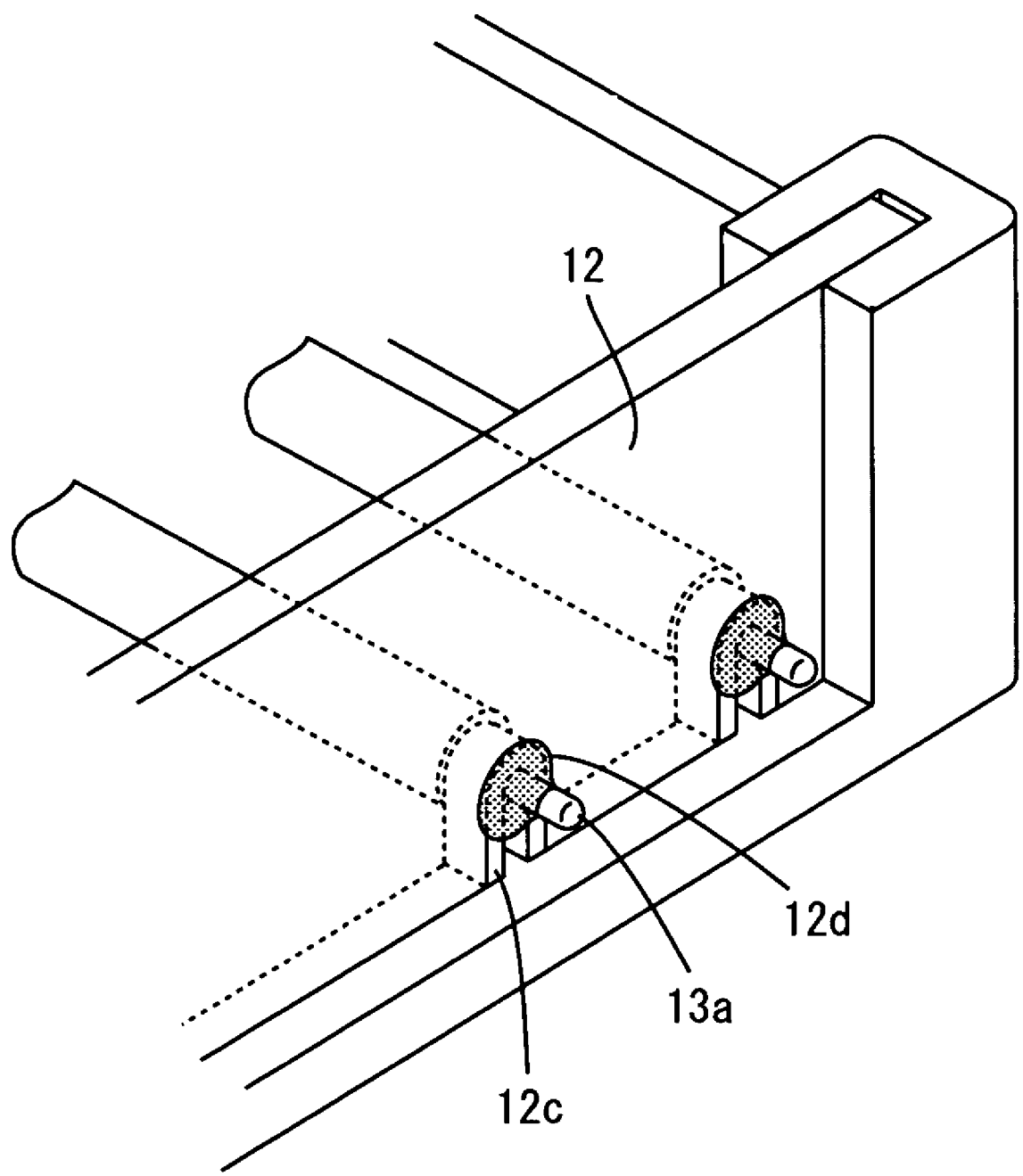

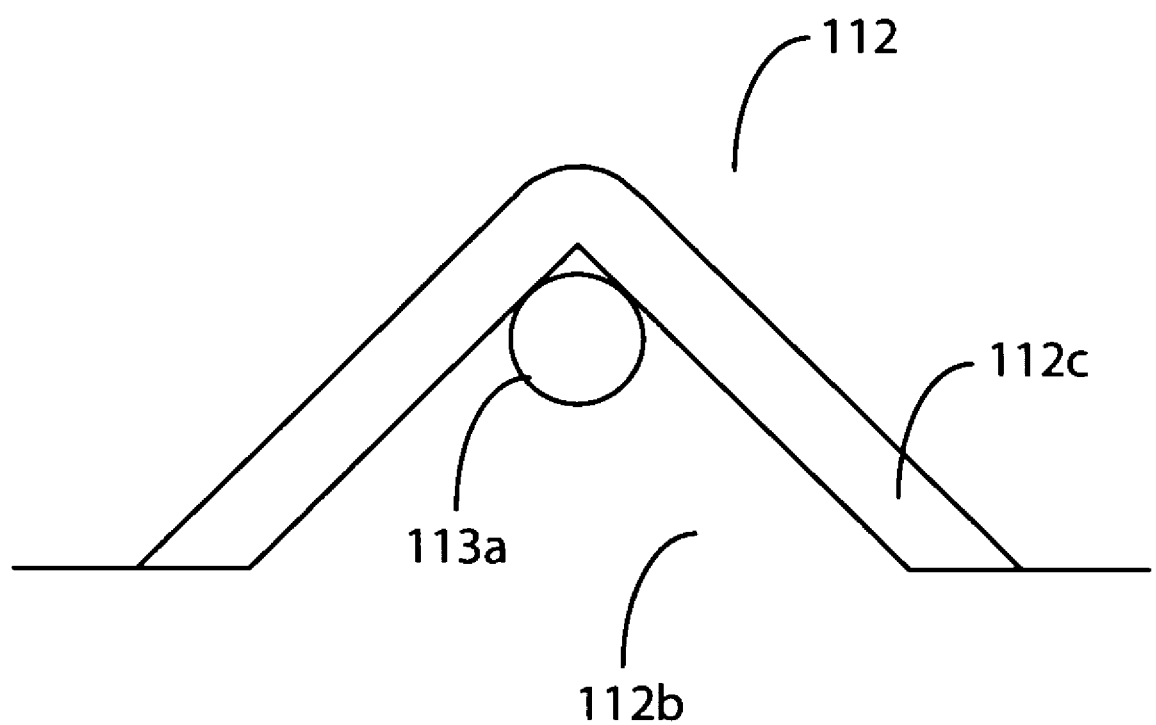

LIQUID CRYSTAL DISPLAY APPARATUS AND LIGHTING UNIT

CROSS-REFERENCES TO RELATED APPLICATIONS

The present application is related to the Japanese Patent Application No. 2007-001611, filed Jan. 9, 2007, the entire disclosure of which is expressly incorporated by reference herein.

BACKGROUND OF THE INVENTION (1) Field of the Invention

The present invention relates to a liquid crystal display apparatus and a lighting unit and, more particularly, to a liquid crystal display apparatus and a lighting unit, in which a plurality of substantially U-shaped cold cathode tubes to which electricity is supplied by an inverter substrate are held parallel relative to a reflector panel.

(2) Description of Related Art

An Japanese Patent Application Laid-Open No. 2002-324592, there has been proposed a structure in which terminals of cold cathode tubes are attached directly to a substrate by soldering. Such a structure allows electrical connection to the cold cathode tubes to be made without using connectors, wires or the like, thus making it possible to provide a lighting unit in which the number of parts thereof is reduced.

The above-mentioned lighting unit is of a type in which one of terminals of the straight cold cathode tube is connected to a small-sized common wiring substrate to which the terminal of the cold cathode tube is to be connected, and is not of a type in which the terminal of the cold cathode tube is connected directly to an inverter substrate. A wire for causing the inverter substrate to be connected to the common wiring substrate is required, so that there is a problem that a leakage current is produced in the wire. The common wiring substrate is satisfied by only providing a common wiring, so that the common wiring substrate may be made thinner. However, the inverter substrate is provided with an inverter circuit, so that the inverter substrate may not be made thinner. Therefore, it is necessary to contrive to stably hold the inverter substrate and contrive to prevent a thickness of the lighting unit from increasing. Moreover, in a case where the above-mentioned technology is applied to a U-shaped cold cathode tube, there is a problem that, when one of terminals provided at both ends of the U-shaped cold cathode tube is subjected to soldering, the other of the terminals rises up from the common wiring substrate and is hard to be subjected to the soldering.

BRIEF SUMMARY OF THE INVENTION

One aspect of the present invention is directed to a lighting unit which comprises: a reflector panel; a plurality of substantially U-shaped cold cathode tubes held parallel relative to the reflector panel, the substantially U-shaped cold cathode tubes being provided at both ends thereof with terminals; an inverter substrate for supplying electricity to the substantially U-shaped cold cathode tubes, the inverter substrate being provided with an electrical supply pattern for supplying the electricity to the cold cathode tubes; cold cathode tube holder for causing the cold cathode tubes to be held parallel relative to the reflector panel in such a manner that the terminals of the cold cathode tubes are arranged in a row along one side of the reflector panel; and substrate holder for causing the inverter substrate to be held vertically relative to the reflector panel in such a manner that a lower side of the inverter substrate reaches a position at which the terminals are lined up in the reflector panel. In this lighting unit, the inverter substrate has a plurality of notches for receiving the terminals, the notches being upwardly cut deep into the lower side of the inverter substrate so as to be disposed along the lower side of the inverter substrate, and solders provided for making electrical connections between the terminals and the electrical supply pattern in the notches.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout:

FIG. 5 is an exemplary perspective view of solders which are provided at the inverter substrate; and FIG. 6 is an exemplary rear view of a modification of the inverter substrate of FIG. 5.

DETAILED DESCRIPTION OF THE INVENTION

The detailed description set forth below in connection with the appended drawings is intended as a description of presently preferred embodiments of the invention and is not intended to represent the only forms in which the present invention may be constructed and/or utilized.

Embodiments of this invention will be discussed hereinafter in the following order.

A. First embodiment;
B. Modification; and
C. Summary.

A. First Embodiment

Figure 1:
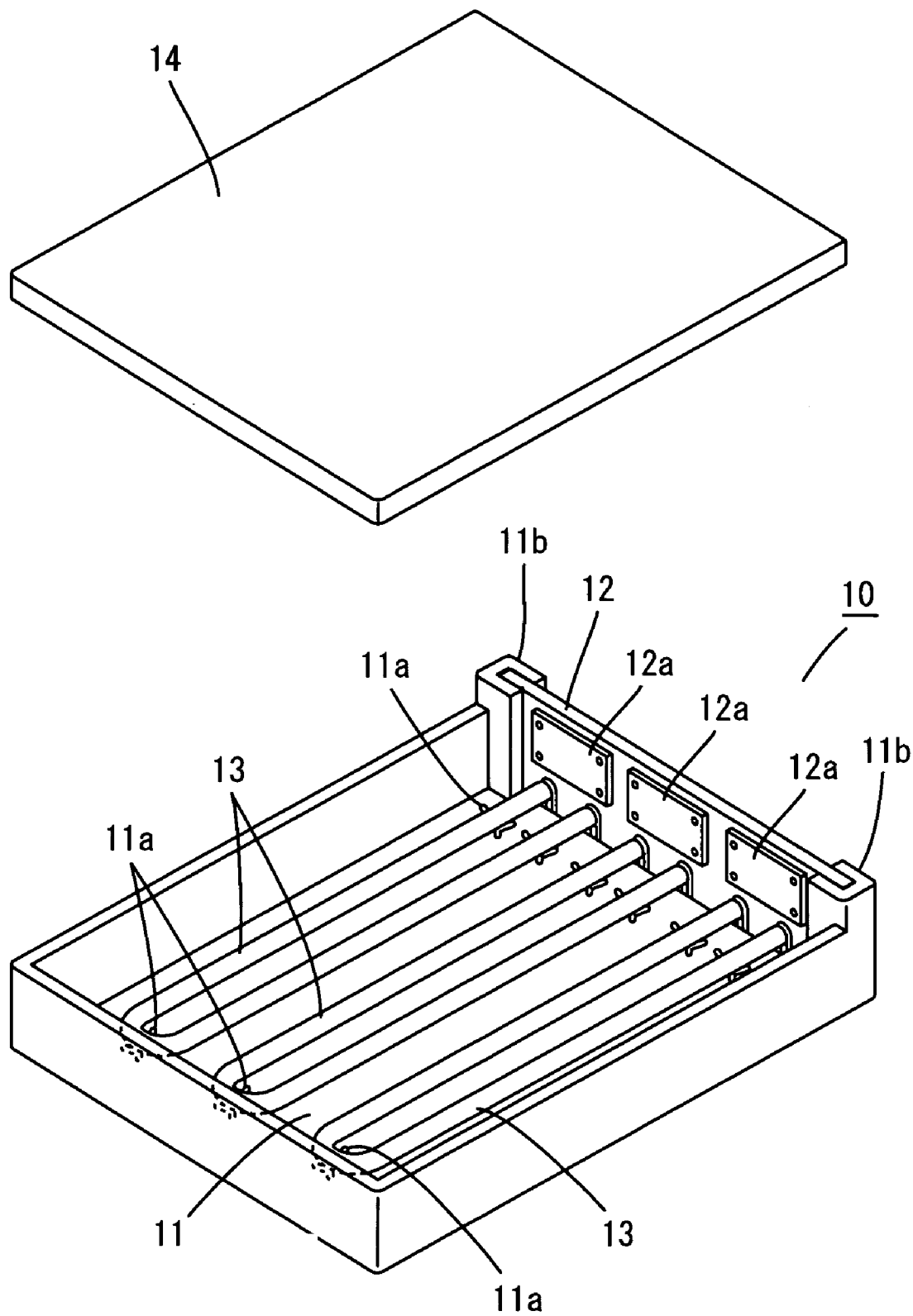
FIG. 1 is an exemplary exploded perspective view of a lighting unit (liquid crystal display apparatus)

FIG. 1 shows a lighting unit according to an embodiment of the present invention, as viewed from an oblique direction. In the example shown in the same Figure, the lighting unit 10 generally includes a reflector panel 11, an inverter substrate 12, three cold cathode tubes 13, and a diffusion plate 14. The reflector panel 11 is formed in a shape of a substantially box having a thin thickness and opened upward. An inner surface of the reflector panel 11 has a high reflectance. The diffusion panel 14 is mounted on the reflector panel 11 so as to put the lid on the reflector plate 11. Moreover, a liquid crystal panel (not shown in drawings) is mounted from the outside of the diffusion plate 14, whereby a liquid crystal display apparatus is formed.

Figure 2:
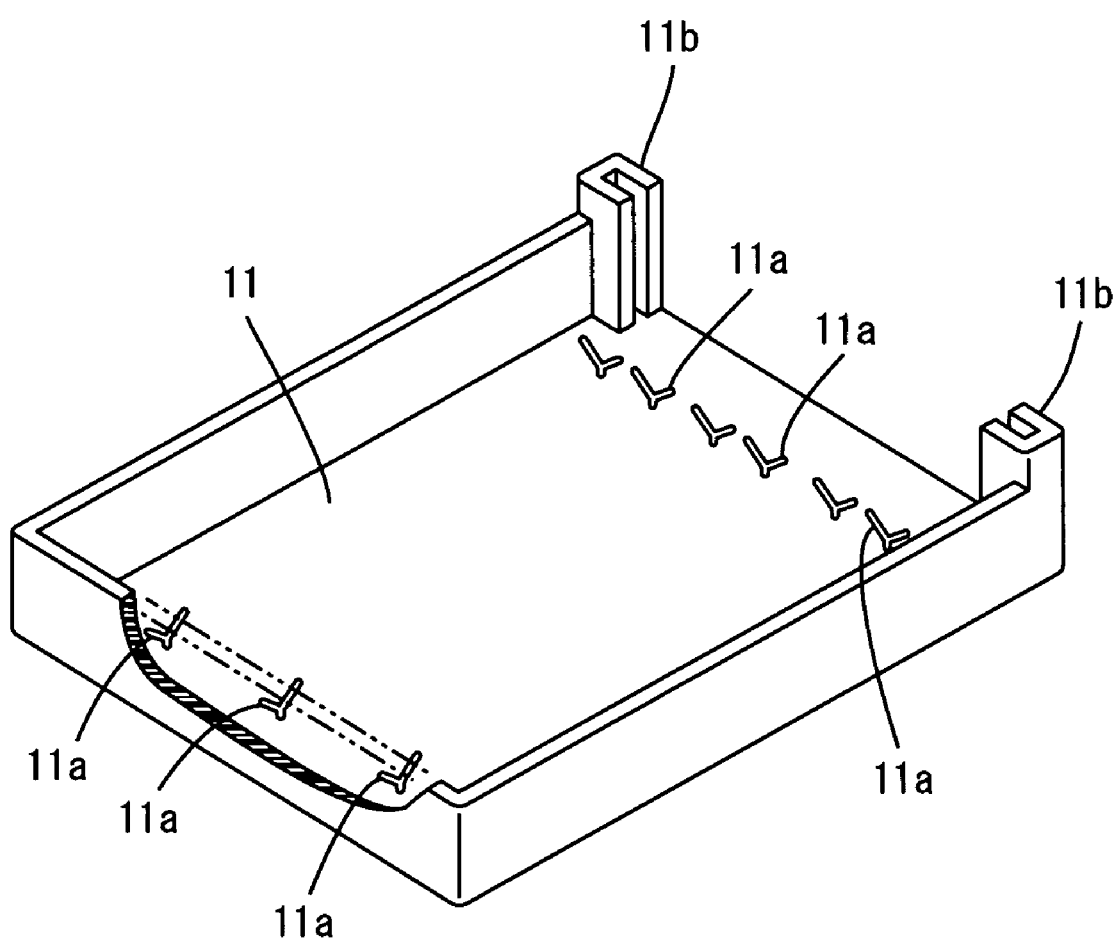
FIG. 2 is an exemplary perspective view of a reflector panel.

FIG. 2 shows the reflector panel 11, as viewed from the oblique direction. In the example shown in the same Figure, the reflector panel 11 is provided with a plurality of cold cathode tube holder 11a which are each projected upward in a substantially Y-shape therefrom. At one side of the reflector panel 11, there are provided a pair of rails 11b of substantially U-shapes in cross-section (substrate holder) which are protrusively provided so as to extend vertically. These rails face inward relative to each other.

Figure 3:
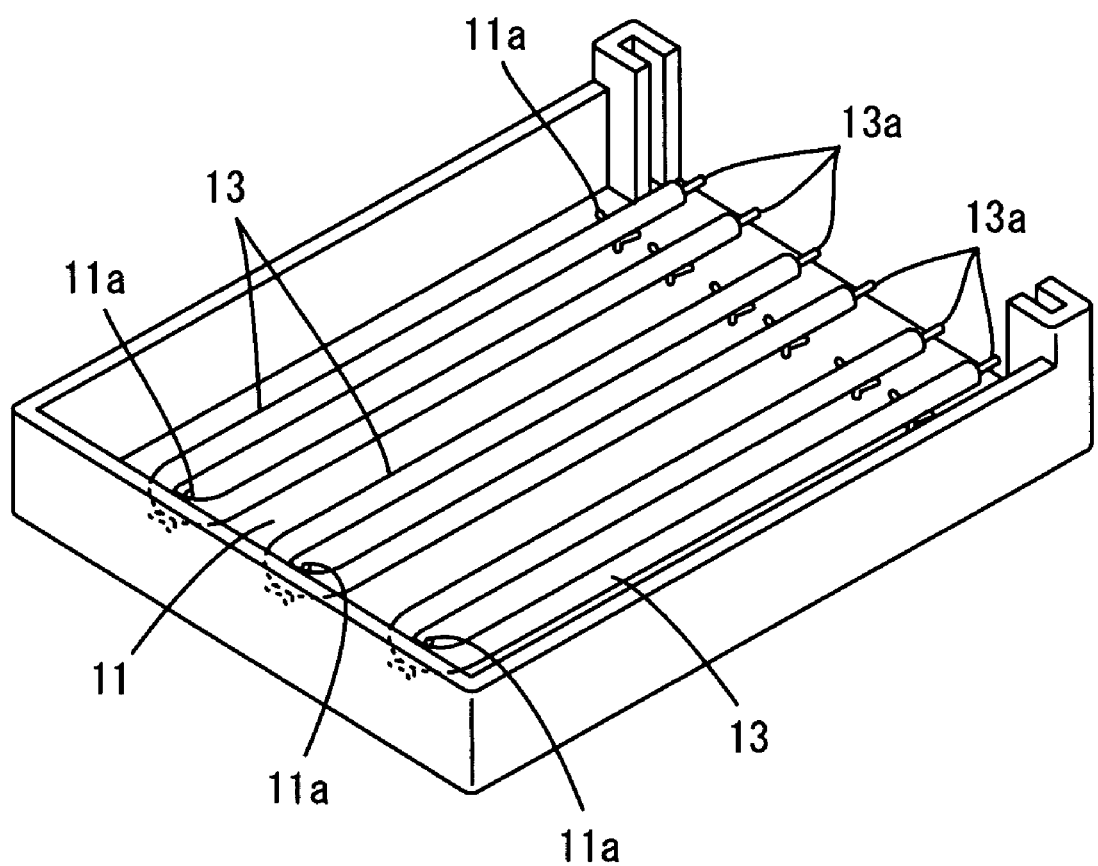
FIG. 3 is an exemplary perspective view of the reflector panel, in which cold cathode tubes are set with respect to the reflector panel.

FIG. 3 shows the reflector panel 11, in a condition where the cold cathode tubes 13 are set with respect to the reflector panel 11, as viewed from the oblique direction. In the example shown in the same Figure, the cold cathode tubes 13 are parallel relative to one another and the orientation of the cold cathode tubes 13 is arranged such that terminals 13a provided at both ends of the cold cathode tubes 13 are located on the side, to which the rails 11b are provided, of the reflector panel 11. The cold cathode tube holder 11a are provided at positions that allow some of the cold cathode tube holder 11a to support portions of the cold cathode tubes 13, which are adjacent the terminals thereof, from a downward direction, and at positions that allow some of the cold cathode tubes holder 11a to support bent portions of the cold cathode tubes 13 from the downward direction.

The respective cold cathode tube holder 11a are formed so as to have the same height, so that the respective cold cathode tubes 13 are held parallel to a bottom surface of the reflector panel 11. When the cold cathode tubes 13 are held by the cold cathode tube holder 11a, the respective terminals 13a are arranged in a row on the side, to which the rails 11b are provided, of the reflector panel 11, and are brought to a condition of being lifted up to a predetermined height from the bottom surface of the reflector plate 11.

The inverter substrate 12, which is formed in a rectangle-shape as shown in FIG. 1, is interposed at short sides thereof between the rails 11b, from an outward direction. More particularly, the inverter substrate 12 is inserted between the rails 11b in such a manner that a lower side of the inverter substrate 12 reaches the bottom surface of the reflector panel 11 by causing the short sides of the inverter substrate 12 to be slid downward along the rails 11b. Thus, the inverter substrate 12 is held vertically relative to the reflector panel 11. On a parts-mounted surface of the inverter substrate 12, substantially rectangle-shaped inverter transformers 12a are mounted.

The inverter transformers 12a are provided so as to positionally correspond to the cold cathode tubes 13, and provided with primary side windings and secondary side windings (not shown). Inputting to the primary side windings oscillation pulses generated by a oscillating circuit (not shown) which is provided at the inverter substrate 12 makes it possible to obtain AC which can be outputted to the respective cold cathode tubes 13 from the secondary side windings. The inverter substrate 12 is inserted between the rails 11b with the parts-mounted surface thereof facing inwardly of the reflector panel 11 and with an opposite pattern surface thereof facing outwardly of the reflector panel 11.

Figure 4:
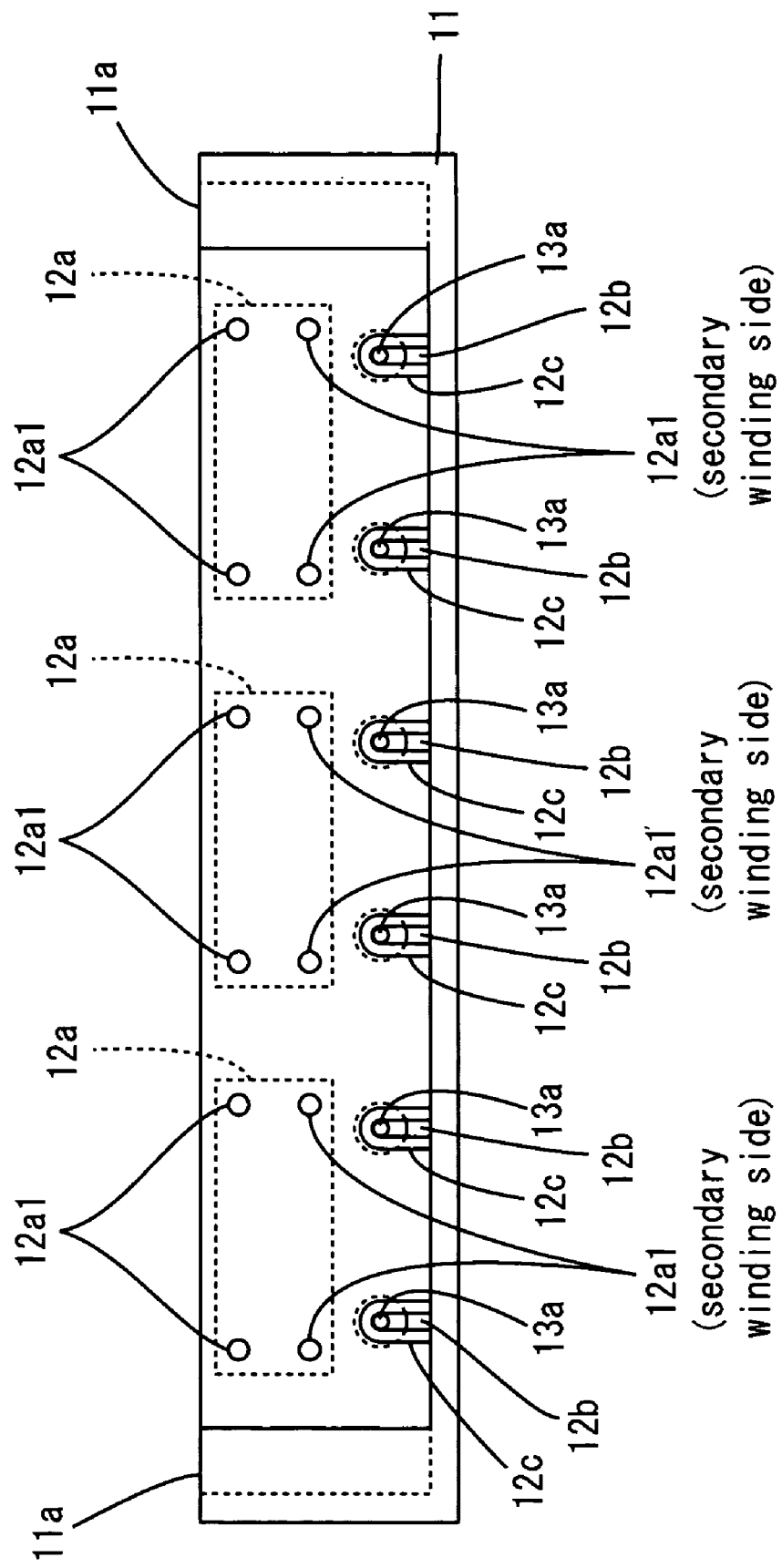
FIG. 4 is an exemplary rear view of an inverter substrate.

FIG. 4 shows the inverter substrate 12 in a state of being inserted between the rails 11b, as viewed from the side of the pattern surface. In the example shown in the same Figure, through-lead-wires 12a1 of the inverter transformers 12a penetrate to the pattern surface of the inverter substrate 12. Among the through-terminals, through-terminals which are arranged adjacent the lower side of the inverter substrate 12 are connected to the secondary side windings. Generally, in each of the inverter transformers 12a, through-terminals on the primary side and through-terminals on the secondary side are provided at the opposite sides of a rectangle-shaped body of the inverter transformer. In the illustrated embodiment, the mounting direction of the inverter transformers 12a is determined in such a manner that the through-lead-wires 12a1 on the secondary side are arranged at the same height and lined up along the lower side of the inverter substrate 12.

The above-mentioned structure allows lengths of wires connected between the cold cathode tubes 13 and the secondary sides of the inverter transformers 12a to be reduced and can prevent a leakage current. Moreover, the inverter substrate 12 can be compactly formed in a thickness direction of the lighting unit 10 and the lighting unit 10 can be made thinner. When the lighting unit 10 is used as a backlight of a liquid crystal television, the liquid crystal television can be made thinner. Incidentally, while the inverter transformers 12a are of a back-mounted-type in this embodiment, surface-mounted-type inverter transformers 12a may be mounted on the pattern surface.

The inverter substrate 12 is formed at the lower side thereof with six notches 12b having shapes upwardly cut deep. The notches 12b are each cut in a substantially U-shape in such a manner that a topmost part thereof is made curved. Solder pads 12c in which copper patterns are exposed to the outside are formed around the notches 12b. The respective solder pads 12c are electrically connected to the secondary side through-lead-wires 12a1 through the copper patterns (not shown) covered with permanent resists. The copper patterns which make the connection between the respective solder pads 12c and the secondary side through-lead-wires 12a1 correspond to an electrical supply pattern in this invention.

When the inverter substrate 12 is slid downward along the rails 11b until the lower side of the inverter substrate 12 reaches the bottom surface of the reflector panel 11, the respective terminals 13a of the cold cathode tubes 13 are received into corresponding notches 12b and then abutted against the curved topmost parts of the notches 12b. The topmost parts are each formed in an upwardly protruding and curved line, so that even if the respective terminals 13a are shifted, they can be guided into the topmost parts of the notches 12b. Moreover, even if the terminals 13a are lifted up, they can be pressed down by the inverter substrate 12 which is slid from the upward direction. Even if the substantially U-shaped cold cathode tubes 13 are inclined, the terminals 13a provided at the both ends of the cold cathode tubes are simultaneously pressed down at the same height, the inclination of the cold cathode tubes 13 in a width direction thereof can be cancelled.

After the insertion of the inverter substrate 12 is completed in the above-mentioned manner, the solder pads 12c are subjected to soldering. FIG. 5 shows solders 12d which are formed at the solder pads 12c. In the example shown in the same Figure, the solders 12d are formed so as to extend over the terminals 13a penetrating the topmost parts of the notches 12b, and the solder pads 12c, so that the terminals 13a and the solder pads 12c are electrically connected to each other. Such solders 12d are formed at all the solder pads 12c. Thus, electrical connection is made between the cold cathode tubes 13 and the inverter substrate 12, and the inverter substrate 12 is firmly fixed to the reflector panel 11.

B. Modification

FIG. 6 shows a part of a modification of the inverter substrate. Like the above-mentioned embodiment, an inverter substrate 112 according to the modification is formed at a lower side thereof with notches 112b (only one notch 112b is shown in FIG. 6). In this modification, the notches 112b are each formed in a substantially triangle-shape. Even if the notches 112b are each formed in such a shape, the guiding of terminals 113a into crests of the notches 112b can be carried out while causing the terminals 113a to be slid along slopes of the notches 113a.

C. Summary

As discussed above, in the lighting unit according to the present invention, the plurality of substantially U-shaped cold cathode tubes are held parallel relative to the reflector panel and the inverter substrate supplies electricity to the cold cathode tubes. The cold cathode tube holder causes the cold cathode tubes to be held parallel relative to the reflector panel in such a manner that the terminals provided at the both ends of the cold cathode tubes are arranged in a row along the one side of the reflector panel. The substrate holder causes the inverter substrate to be held vertically relative to the reflector panel in such a manner that the lower side of the inverter substrate reaches the position at which the terminals are lined up in the reflector panel. At the lower side of the inverter substrate which reaches the position at which the terminals are lined up in the reflector panel, the plurality of notches which are upwardly cut deep into the lower side of the inverter substrate are provided. The terminals of the cold cathode tubes are inserted in the notches. In the notches, there are provided the solders making the electrical connection between the terminals of the cold cathode tubes and the electrical supply pattern formed on the inverter substrate for supplying electricity to the cold cathode tubes. By constructing as discussed above, it is possible to provide a liquid crystal display apparatus and a lighting unit, in which leakage current between the inverter substrate and the cold cathode tubes is reduced.

Moreover, according to the embodiment of the present invention, the substrate holder comprises the pair of substantially U-shaped rails interposingly hold the both sides of the rectangle-shaped inverter substrate therebetween from the outward direction. The rectangle-shaped inverter substrate is interposedly held from the outward direction by the pair of rails of substantially U-shapes in cross-section. Thus, the inverter substrate can be stably held.

Moreover, according to the embodiment of the present invention, the electrical supply pattern is electrically connected to the secondary winding sides of the inverter transformers provided at the inverter substrate, and the inverter transformers are mounted on the inverter substrate in such a direction that the terminals on the secondary winding sides are arranged along the lower side of the inverter substrate. The electrical supply pattern is electrically connected to the secondary winding sides of the inverter transformers provided at the inverter substrate, so that AC electricity on the secondary sides is supplied to the cold cathode tubes. As discussed above, the inverter transformers are mounted on the inverter substrate in such a direction that the terminals on the secondary winding sides are arranged along the lower side of the inverter substrate. Such a structure makes it possible to reduce the wiring length of the electrical supply pattern and make the lighting unit thinner.

The present invention may be embodied as a liquid crystal display apparatus which employs the above-mentioned structure. As the embodiment, there is provided with A liquid crystal display comprising: a reflector panel; a plurality of substantially U-shaped cold cathode tubes held parallel relative to the reflector panel; an inverter substrate formed in a substantially rectangular shape for supplying electricity to the cold cathode tubes; inverter transformers mounted on the inverter substrate in such a direction that lead wires from secondary winding sides are arranged along the lower side of the inverter substrate; cold cathode tube holders for holding the cold cathode tubes parallel relative to the reflector panel in such a manner that terminals of the cold cathode tubes are arranged in a row along one side of the reflector panel; a substrate holder for holding the inverter substrate to be vertically relative to the reflector panel in such a manner that a lower side of the inverter substrate reaches a positions where the terminals are arranged in a row, the substrate holder comprising a pair of substantially U-shaped rails interposingly holding opposite sides of the inverter substrate; a plurality of notches upwardly cut deep from the lower side of the inverter substrate so as to receive the terminals; and solders provided for making electrical connections between the terminals and electrical supply patterns formed in the notches.

The inverter substrate has a plurality of notches for receiving the first terminals and solders. The notches are upwardly cut deep into the lower side of the inverter substrate so as to be disposed along the lower side of the inverter substrate, and the solders are for making electrical connections between the second terminals on the secondary winding sides and the electrical supply pattern in the notches. Such a structure makes it possible to provide a liquid crystal display apparatus and lighting unit in which leakage current between the inverter substrate and the cold cathode tubes is reduced.

Although the invention has been described in considerable detail in language specific to structural features or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It is to be understood that the phraseology and terminology employed herein, as well as the abstract, are for the purpose of description and should not be regarded as limiting.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A lighting unit, comprising:
a substantially box-configured reflector panel that is capped by a diffusion plate at a top opening of the reflector panel;
the reflector panel includes a reflective inner bottom surface, a first, second, and a third lateral walls that are transversely and longitudinally flat and are perpendicular to the reflective inner bottom surface, and a lateral opening parallel with the third lateral wall with a pair of substrate holders at distal ends of the lateral opening;
a first side of the lateral opening includes a first substrate holder of the pair of substrate holders that is integral with a first distal end of the first lateral wall;
a second side of the lateral opening includes a second substrate holder of the pair of substrate holders integral with a second distal end of the second lateral wall;

a plurality of substantially U-shaped cold cathode tubes held parallel relative to the reflector panel;

an inverter substrate for supplying electricity to the cold cathode tubes;

the inverter substrate is held vertically to the reflector panel and closes-off the lateral opening;

inverter transformers mounted on the inverter substrate with lead wires from secondary winding sides arranged along the lower side of the inverter substrate that are held vertically to the reflector panel;

cold cathode tube holders for holding the cold cathode tubes parallel relative to the reflector panel with terminals of the cold cathode tubes arranged in a row along one side of the reflector panel;

a substrate holder for holding the inverter substrate that mounts the inverter transformers to be vertically relative to the reflector panel with a lower side of the inverter substrate reaching a position where the terminals are arranged in a row;

a plurality of notches upwardly cut deep from the lower side of the inverter substrate that mounts the inverter transformers so as to receive the terminals; and solders provided for making electrical connections between the terminals and electrical supply patterns formed in the notches.

2. A lighting unit as set forth claim 1, wherein:

the inverter substrate is formed in a rectangle-shape, and the substrate holder comprises a pair of rails having substantially U-shapes in cross-section and interposingly holding opposite sides of the rectangle-shaped inverter substrate.

3. A lighting unit as set forth claim 1, wherein:

the inverter substrate is provided with the inverter transformers, and the electrical supply pattern is electrically connected to the lead wires.

4. A liquid crystal display, comprising:

a substantially box-configured reflector panel that is capped by a diffusion plate at a top opening of the reflector panel;

the reflector panel includes a reflective inner bottom surface, three lateral walls that are transversely and longitudinally flat and are perpendicular to the reflective inner bottom surface, and a lateral opening with a pair of substrate holders at distal ends of the lateral opening;

a first side of the lateral opening includes a first substrate holder that is integral with a first distal end of a first lateral wall of the three lateral walls;

a second side of the lateral opening includes a second substrate holder integral with a second distal end of a second lateral wall of the three lateral walls, with the lateral opening parallel with a third lateral wall of the three lateral walls;

a plurality of substantially U-shaped cold cathode tubes held parallel relative to the reflector panel;

an inverter substrate formed in a substantially rectangular shape for supplying electricity to the cold cathode tubes;

the inverter substrate is held vertical to the reflector panel and closes-off the lateral opening;

inverter transformers mounted on the inverter substrate with lead wires from secondary winding sides arranged along the lower side of the inverter substrate that is held vertically to the reflector panel;

cold cathode tube holders for holding the cold cathode tubes parallel relative to the reflector panel with terminals of the cold cathode tubes arranged in a row along one side of the reflector panel;

a substrate holder for holding the inverter substrate to be vertically relative to the reflector panel with a lower side of the inverter substrate reaching a position where the terminals are arranged in a row, the substrate holder comprising a pair of substantially U-shaped rails interposingly holding opposite sides of the inverter substrate that mounts the inverter transformers;

a plurality of notches upwardly cut deep from the lower side of the inverter substrate that mounts the inverter transformers so as to receive the terminals; and solders provided for making electrical connections between the terminals and electrical supply patterns formed in the notches.

5. A lighting unit, comprising:

a substantially box-configured reflector panel that is capped by a diffusion plate at a top opening of the reflector panel;

the reflector panel includes a reflective inner bottom surface, a first, second, and a third lateral walls that are transversely and longitudinally flat and are perpendicular to the reflective inner bottom surface, and a lateral opening parallel with the third lateral wall with a pair of substrate holders at distal ends of the lateral opening;

a first side of the lateral opening includes a first substrate holder of the pair of substrate holders that is integral with a first distal end of the first lateral wall;

a second side of the lateral opening includes a second substrate holder of the pair of substrate holders integral with a second distal end of the second lateral wall;

the first substrate holder and the second substrate holder have a substantially U-shaped cross-sections that extend longitudinally, perpendicular to the reflective inner bottom surface of the reflective panel, with U-shaped cross-sections of the first substrate holder and the second substrate holder facing one another;

a plurality of Y-shaped cold cathode tube holders positioned on the reflective inner bottom surface of the reflector panel;

a plurality of U-shaped cold cathode tubes held and maintain parallel relative to the reflective inner bottom surface of the reflector panel by the plurality of Y-shaped cold cathode tube holders, with terminals of the plurality of cold cathode tubes arranged in a row along only the lateral opening of the reflective panel;

a substantially rectangular inverter substrate is widthwise inserted within the U-shaped cross-sections of the pair of substrate holders to close-off the lateral opening, with the inverter substrate detachably oriented perpendicular to the reflective inner bottom surface of the reflective panel, parallel the third wall;

the inverter substrate includes a plurality of inverter transformers longitudinally aligned along a length of the inverter substrate and facing the third wall;

a lower side of the inverter substrate includes a plurality of notches upwardly cut deep from the lower side of the inverter substrate to accommodate the terminals of the plurality of cold cathode tubes, with the terminals abutted against a curved topmost sections of the notches;

the inverter transformers include lead wires from secondary winding sides arranged along the lower side of the inverter substrate; and the terminals of the plurality of cold cathode tubes and the lead wires from the secondary winding sides of the inverter transformers are electrically within the notches by connected by soldering to reduce and prevent current leakage.

* * * * *